(12) United States Patent
Steert et al.

(10) Patent No.: US 9,920,213 B2
(45) Date of Patent: Mar. 20, 2018

(54) WHITE INKJET INK PRINTING

(71) Applicant: AGFA NV, Mortsel (BE)

(72) Inventors: Koen Steert, Mortsel (BE); Johan Meys, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 15/638,415

(22) Filed: Jun. 30, 2017

(65) Prior Publication Data

US 2017/0298247 A1    Oct. 19, 2017

Related U.S. Application Data

(62) Division of application No. 14/889,540, filed as application No. PCT/EP2014/060902 on May 27, 2014, now Pat. No. 9,783,696.

(30) Foreign Application Priority Data

Jun. 24, 2013    (EP) ..................... 13173345

(51) Int. Cl.
*B41J 2/21*    (2006.01)
*C09D 11/54*    (2014.01)
(Continued)

(52) U.S. Cl.
CPC ............. *C09D 11/54* (2013.01); *B41J 2/2114* (2013.01); *B41J 2/2117* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2006/0038861 A1*   2/2006   Piock .................. B41J 2/175
                                                   347/84
2008/0074482 A1*   3/2008   Makuta ................ B41J 11/002
                                                   347/102
(Continued)

OTHER PUBLICATIONS

Steert et al., "White Inkjet Ink Printing", U.S. Appl. No. 14/889,540, filed Nov. 6, 2015.

*Primary Examiner* — Manish S Shah
(74) *Attorney, Agent, or Firm* — Keating and Bennett, LLP

(57)    ABSTRACT

An inkjet printing method includes the steps of: a) printing a first print job by jetting a free radical UV curable white inkjet ink from a white ink print head and one or more free radical UV curable color inkjet inks from one or more other print heads in a UV curable inkjet printer; b) filling the white ink print head in the UV curable inkjet printer with a safeguard liquid including one or more free radical polymerizable monomers; c) printing a second print job employing only the one or more other print heads in the UV curable inkjet printer for jetting one or more free radical UV curable color inkjet inks; d) replacing the safeguard liquid of the white ink print head in the UV curable inkjet printer by UV curable white inkjet ink; and e) printing a third print job by jetting free radical UV curable white inkjet ink from the white ink print head and jetting one or more free radical UV curable color inkjet inks from one or more other print heads in the UV curable inkjet printer.

6 Claims, 2 Drawing Sheets

(51) Int. Cl.
*B41M 5/00* (2006.01)
*C09D 11/101* (2014.01)
*C09D 11/322* (2014.01)
*C09D 11/40* (2014.01)
*B41M 7/00* (2006.01)

(52) U.S. Cl.
CPC ........ *B41M 5/0023* (2013.01); *B41M 7/0081* (2013.01); *C09D 11/101* (2013.01); *C09D 11/322* (2013.01); *C09D 11/40* (2013.01)

(58) Field of Classification Search
CPC ...... B41J 2/1755; B41J 2/2114; B41J 2/2117; B41J 11/0015; B41J 11/002; B41J 2/2056; B41J 2/21; B41J 2/0057; B41J 3/60; B41J 2002/012; B41J 2/04598; B41J 2/04586; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
See application file for complete search history.

(56) References Cited

U.S. PATENT DOCUMENTS

| | | | |
|---|---|---|---|
| 2010/0026743 A1* | 2/2010 | Van Thillo | B41J 2/2107 347/100 |
| 2010/0302300 A1* | 12/2010 | Verdonck | B41J 2/2107 347/17 |
| 2012/0277340 A1* | 11/2012 | Thillo | B41J 2/2107 522/46 |
| 2013/0096225 A1* | 4/2013 | Verdonck | B41J 2/2107 522/168 |

* cited by examiner

WHITE INKJET INK PRINTING

CROSS-REFERENCE TO RELATED APPLICATIONS

This application is a 371 National Stage Application of PCT/EP2014/060902, filed May 27, 2014. This application claims the benefit of European Application No. 13173345.3, filed Jun. 24, 2013, which is incorporated by reference herein in its entirety.

BACKGROUND OF THE INVENTION

1. Field of the Invention

The present invention relates to white inkjet ink printing methods.

2. Description of the Related Art

Printing systems, such as offset and flexography, are being increasingly replaced for printing applications, such as billboards, packaging and decoration, by industrial inkjet printing systems due to their flexibility in use, e.g. variable data printing, and due to their enhanced reliability, allowing their incorporation into production lines. UV curable inkjet inks are particularly preferred because high quality images can be printed on non-absorbing ink-receivers.

White UV curable inkjet inks are advantageously used to mask defects on the ink-receivers and enhance the contrast and vividness of colour inkjet inks in a so-called "surface printing mode" or in a "backing printing mode". In surface printing, a colour image is printed on a white background formed on an ink-receiver using white inkjet ink, hereafter the final image is viewed from the printed face. In so-called backing printing, a colour image is printed on a transparent ink-receiver using colour inkjet inks and then a white inkjet ink is applied onto the colour image, hereafter the final image is observed through the transparent substrate.

For a white inkjet ink, preferably pigments with a high refractive index, such as titanium dioxide, are used in white ink in order to obtain a sufficient opacity. Sedimentation of these dense particles in a low viscosity fluid, such as an inkjet ink, is a real challenge for ink formulators. Problems of clogging of inkjet print head nozzles and poor storage stability of the ink are direct consequences of sedimentation and aggregation of white pigments due to the difference in specific gravity between pigment particles and the liquid medium of the ink. Hence, improvement of inkjet printing methods employing white inkjet ink for reliability and incorporation into production lines is still necessary.

One approach is to reduce sedimentation of the white inkjet ink. For example, U.S. Pat. No. 4,880,465 (VIDEOJET) discloses a non-pigmented white inkjet ink comprising hollow microspheres in the ink vehicle. Sedimentation is drastically reduced, however the opacity of such a printed white layer remains rather limited. EP 2599841 A (AGFA) discloses a white inkjet ink prepared by combining a white pigment dispersion having an average particle size above 200 nm with a second pigment dispersion having an average particle size between 40 and 90 nm. White ink sedimentation was not prevented, but it took only minor force to redisperse to a very large extent the sediment of the white pigment at the bottom of a stored ink container. EP 1770132 A (FUJIFILM) discloses an inkjet-recording ink composition comprising one or more white pigment(s), one or more polymer dispersant(s), one or more photocurable compound(s), and one or more photoinitiator(s) as its principal components, wherein the polymer dispersant(s) has a sulfonic acid group. The white inkjet ink has a composition that prevents nozzle clogging by improving dispersion stability of the ink and suppresses sedimentation of the pigment.

Another approach is to use specific inkjet printing methods or inkjet printer configurations. For example, EP 2053099 A (AGFA) discloses a inkjet printing method comprising the step of jetting a higher viscous white inkjet ink at a higher temperature than a colour inkjet ink. It is known that less sedimentation of white pigment is observed when the white ink possesses a higher viscosity. The effect of a higher viscosity for less sedimentation is also exploited in inkjet printing methods WO 2008/074548 (AGFA), where a higher viscous white ink is mixed inside the inkjet printer with one or more colourless liquids to form a white ink-mixture having a viscosity suitable for inkjet printing.

Problems of white inkjet ink sedimentation lead to frequent maintenance of white inkjet print heads using so-called "flushing" or "washing" liquids for unclogging of inkjet nozzles and cleaning the nozzle plate of the print head. For example, EP 2157163 A (TOYO INK) discloses a maintenance liquid for inkjet printers comprising at least one of glycol ethers and glycol esters and 45 to 10 mg/L of dissolved oxygen. EP 1621348 A (TOSHIBA TEC) discloses a washing solution for washing a cationically UV curable inkjet ink inkjet printer head, which contains not less than 50 parts by weight of a polymerizable compound selected from the at least two kinds of polymerizable compounds included in the ink and having the lowest viscosity among the at least two kinds of polymerizable compounds, or not less than 50 parts by weight of a polymerizable compound having a viscosity of 30 mPa·s or less at ordinary temperature.

However, there is still room for improvement of white inkjet inks and white inkjet ink printing methods wherein the problems of nozzle clogging and sedimentation are reduced so that reliable inkjet printing of white ink in industrial environment is possible.

SUMMARY OF THE INVENTION

In order to overcome the problems described above, preferred embodiments of the present invention have been realised with an inkjet printing method as defined below.

It was found that very reliable white inkjet printing was accomplished by switching the content of a white print head between UV curable white inkjet ink and a safeguard liquid depending on the fact if a print job requires white ink respectively if a print job requires no white ink. Due to this switching sedimentation of white pigment and clogging of nozzles was effectively prevented.

Further advantages and benefits of the invention will become apparent from the description hereinafter.

Figure 1:
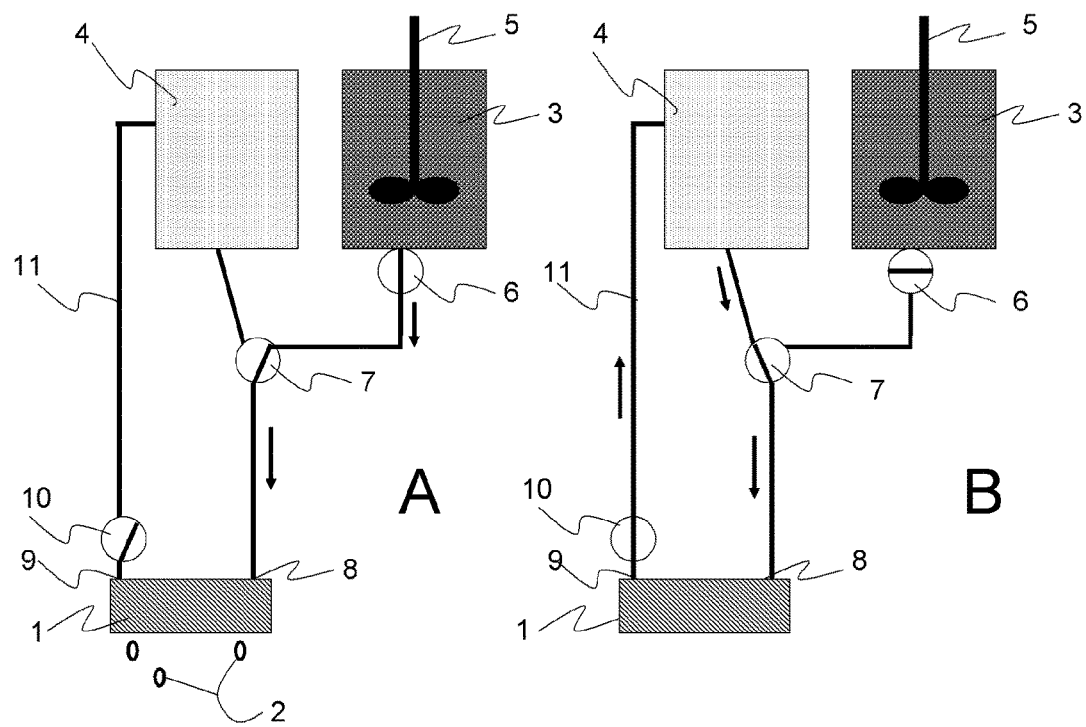
FIG. 1 is a schematic representation showing two operation modes A and B of a white ink continuous ink flow print head. In the operation mode A, the continuous ink flow printhead 1 is jetting white ink droplets 2 supplied to the continuous ink flow printhead 1 from the white ink supply tank 3 to the print head inlet 9, by having the valves 6 and 7 in a position allowing transport of white ink to the continuous ink flow printhead 1 and valve 10 in a position preventing transport via the print head outlet 10 through a recirculation circuit 11 to a safeguard liquid supply tank 4.

In the operation mode B, the continuous ink flow printhead 1 is incapable of jetting white inkjet ink, but instead safeguard liquid is supplied from a safeguard liquid supply tank 4 to the continuous ink flow printhead 1 via the print head inlet 9 and then returned via the print head outlet 10 through a recirculation circuit 11 to a safeguard liquid supply tank 4, by having the valves 7 and 10 in a position allowing recirculation of safeguard liquid.

Figure 2:
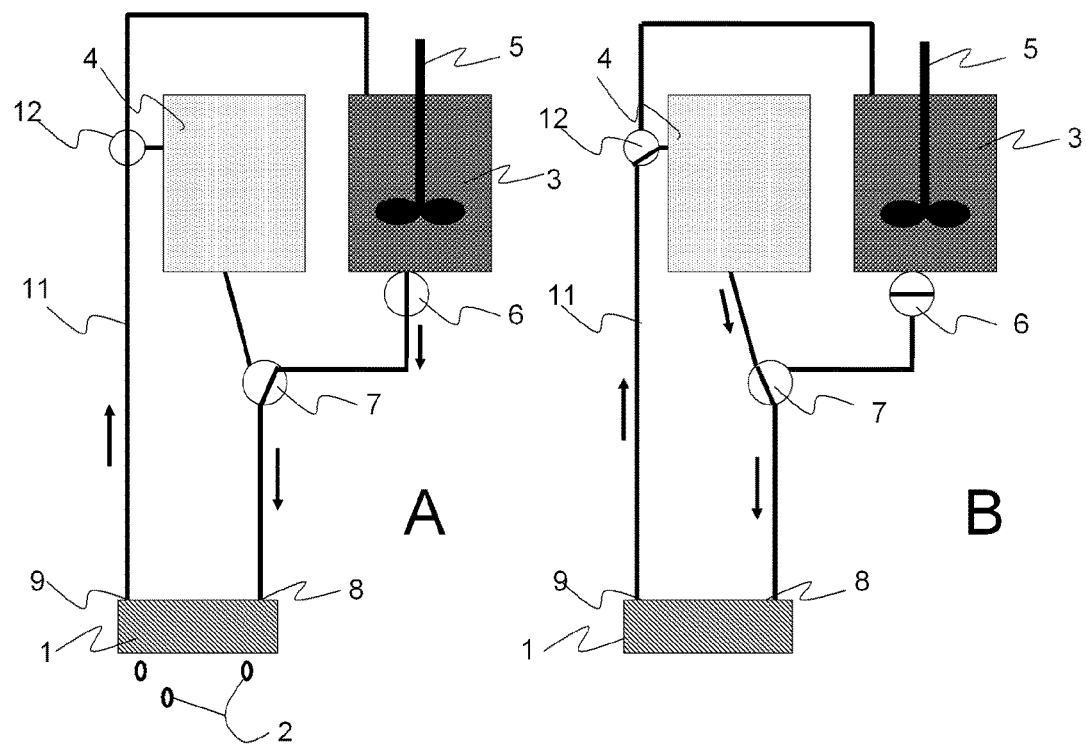

FIG. 2 is a schematic representation showing two operation modes A and B of a white ink continuous ink flow printhead 1. In the operation mode A, the continuous ink flow printhead 1 is jetting white ink droplets 2 supplied to the continuous ink flow printhead 1 from the white ink supply tank 3 to the print head inlet 9, by having the valves 6 and 7 in a position allowing transport of white ink to the continuous ink flow printhead 1 and valve 12 in a position allowing transport via the print head outlet 10 through a recirculation circuit 11 to the white ink supply tank 3. In the operation mode B, the continuous ink flow printhead 1 is incapable of jetting white inkjet ink, but instead safeguard liquid is supplied from a safeguard liquid supply tank 4 to the continuous ink flow printhead 1 via the print head inlet 9 and then returned via the print head outlet 10 through a recirculation circuit 11 to a safeguard liquid supply tank 4, by having the valves 7 and 12 in a position allowing recirculation of safeguard liquid.

Figure 3:
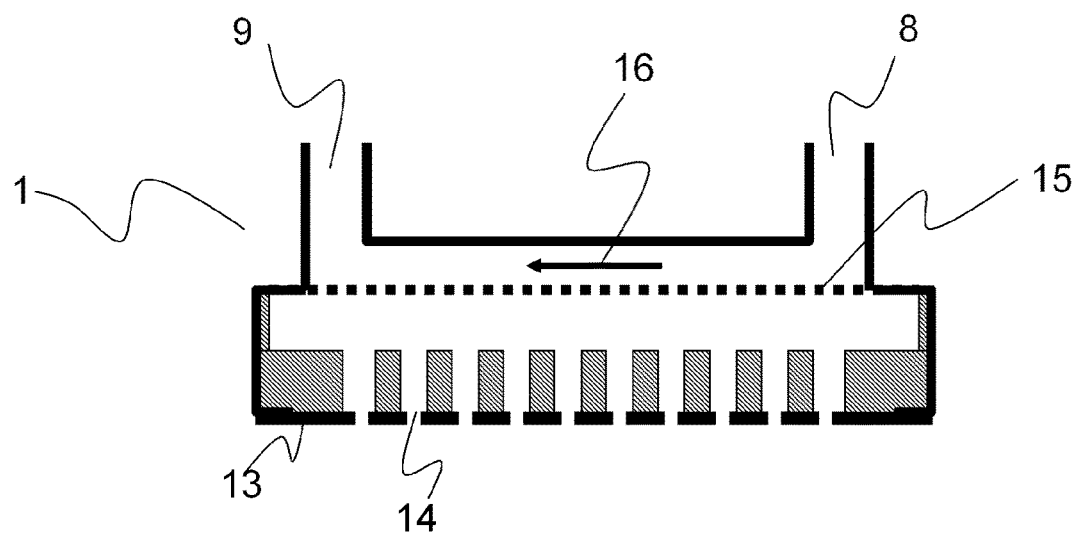

FIG. 3 is a schematic representation showing a continuous ink flow printhead 1 wherein white ink is entering the print head via the print head inlet 8 and leaving the print head via the print head outlet 9 creating an ink flow 16 which prevents sedimentation of white pigment on the filter 15 when the print head is not jetting white ink from the nozzles 14 in the nozzle plate 13.

DETAILED DESCRIPTION OF THE PREFERRED EMBODIMENTS

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester group, amide group, ether group, thioether group, ketone group, aldehyde group, sulfoxide group, sulfone group, sulfonate ester group, sulphonamide group, —Cl, —Br, —I, —OH, —SH, —CN and —NO$_2$.

The term "inkjet ink set", as used in disclosing the present invention means the inkjet ink set which is coupled to the inkjet printer.

Inkjet Printing Methods

An inkjet printing method according to a preferred embodiment of the present invention includes the steps of: a) printing a first print job by jetting a free radical UV curable white inkjet ink from a white ink print head and one or more free radical UV curable colour inkjet inks from one or more other print heads in a UV curable inkjet printer; b) filling the white ink print head in the UV curable inkjet printer with a safeguard liquid including one or more monomers; c) printing a second print job employing only the one or more other print heads in the UV curable inkjet printer for jetting one or more free radical UV curable colour inkjet inks; d) replacing the safeguard liquid of the white ink print head in the UV curable inkjet printer by UV curable white inkjet ink; and e) printing a third print job by jetting free radical UV curable white inkjet ink from the white ink print head and jetting one or more free radical UV curable colour inkjet inks from one or more other print heads in the UV curable inkjet printer.

For reasons of productivity, the downtime of the UV curable inkjet printer due to step b or d is preferably minimized. In one preferred embodiment, the step b is executed within 15 minutes. In another preferred embodiment, there is at least a partial time-overlap between steps b and c, e.g. the step b is being executed while step c has already started, and i.e. steps b and c are executed simultaneously.

In a preferred embodiment, the step d is started before step c has been completed.

The white ink print head is preferably a continuous ink flow printhead. A continuous ink flow printhead is a print head having an inlet and outlet for ink, so that there is a continuous ink flow through the printhead even during droplet ejection through a nozzle. The continuous ink flow removes air bubbles and agglomerated particles from the ink chamber of the printhead which can block nozzles and prevent firing of ink.

Sedimentation problems of white inkjet ink are already reduced by using a continuous ink flow print head as shown in FIG. 3, especially in the area between the print head inlet 8, the print head outlet 9 and the filter 15. However, sedimentation of white pigment may still occur in the print head area between the filter 15 and the nozzle plate 13, leading to clogging of one or more nozzles 14. Such nozzles are addressed in the art as "failing nozzles". In order to solve the problem of nozzle clogging, it is necessary to replace the white inkjet by a safeguard liquid if it is intended that white inkjet print head will not be used for a while, e.g. one or more print jobs which may take hours or even days or weeks to complete. Such a print job may, for example, be printing a commercial packaging material which already has a white background and thus requires no white inkjet printing. Another print job may employ a transparent packaging material and the inkjet printing of a white background is desirable for the vividness of the colours.

The UV curable white inkjet ink used in a preferred embodiment of the present invention is a free radical polymerizable ink composition. It was found that cationically curable white inkjet inks posed problems of jetting reliability in industrial inkjet printing systems due to UV stray light. UV stray light hitting the nozzle plate of an inkjet print head results into failing nozzles due to clogging by cured white ink in a nozzle. Unlike free radical ink where radical species have a much shorter lifetime, the cationic curable ink continues to cure once an acid species has been generated by UV light in the nozzle. Also a small amount of acid remaining e.g. in the recirculation circuit 11 connected to the continuous ink flow printhead1 in FIG. 1 or FIG. 2 may result to undesired polymerization of the white ink or even the safeguard liquid.

Free Radical UV Curable Inkjet Ink Sets

The free radical UV curable inkjet ink set used in the inkjet printing method according to a preferred embodiment of the present invention includes a free radical UV curable white inkjet ink, one or more free radical UV curable colour inkjet inks and a safeguard liquid, wherein the safeguard liquid includes one or more free radical polymerizable monomers but preferably no photoinitiator.

The free radical UV curable inkjet ink set preferably includes one or more free radical polymerizable monomers in the safeguard liquid that are also present in the free radical UV curable white inkjet ink. More preferably, the free radical polymerizable monomers of the safeguard liquid are present in the same ratio as in the free radical UV curable white inkjet ink. By using monomers in the safeguard liquid that are also present in the free radical UV curable white inkjet ink, one can obtain faster reliable printing of the white inkjet ink for the third print job. Monomers are fluids that usually constitute the major part of the inkjet ink composition. In changing the safeguard liquid by the free radical UV curable white inkjet ink, there is a gradual mixing of the monomers resulting after a certain time in the monomer mixture of the free radical UV curable white inkjet ink which was optimized for properties like adhesion, scratch resistance and flexibility.

In one embodiment, some of the monomers in the free radical UV curable white inkjet ink are replaced by less volatile monomers in the safeguard liquid. For example, a popular low viscosity monofunctional monomer in free radical UV curable white inkjet ink is tetrahydrofurfuryl (meth)acrylate. It was found that a vessel of tetrahydrofurfuryl acrylate kept at 40° C. for 100 hours lost 40% of its weight. A high evaporation of tetrahydrofurfuryl (meth) acrylate from a print head nozzle during a stand-by mode from the inkjet printer may lead to some components dissolved in the safeguard liquid, such as surfactants, being deposited on a nozzle orifice or even the nozzle plate. This may result to jetting failures of the print head. In such a case, the tetrahydrofurfuryl (meth)acrylate of the free radical UV curable white inkjet ink is preferably by a low viscosity monomer exhibiting a small evaporation rate, such as e.g. a vinyl ether(meth)acrylate. For example, 2-(2-vinyloxyethoxy)ethyl acrylate (VEEA) kept at 40° C. for 100 hours loses only 8% of its weight.

In a preferred embodiment, the mixture of free radical polymerizable monomers in the safeguard liquid has a smaller evaporation rate than the mixture of free radical polymerizable monomers in the free radical UV curable white inkjet ink.

In a preferred embodiment, all the monomers in the safeguard liquid lose less than 15% of their weight when kept at 40° C. for 100 hours in an open cubic vessel The free radical UV curable inkjet ink set includes one or more free radical UV curable colour inkjet inks, preferably the free radical UV curable inkjet ink set includes at least a cyan inkjet ink (C), a magenta inkjet ink (M), a yellow inkjet ink (Y) and a black inkjet ink (K).

The curable CMYK-ink set may also be extended with extra inks such as red, green, blue, and/or orange to further enlarge the colour gamut of the image. The CMYK-ink set may also be extended by the combination of the full density inkjet inks with light density inkjet inks. The combination of dark and light colour inks and/or black and grey inks improves the image quality by a lowered graininess.

White Inkjet Inks

The free radical UV curable white inkjet ink includes preferably a pigment with a high refractive index, preferably a refractive index greater than 1.60, preferably greater than 2.00, more preferably greater than 2.50 and most preferably greater than 2.60. Such white pigments generally have a very covering power, i.e. a limited amount of white ink is necessary to hide the colour and defects of the substrate on which it is printed. Unfortunately, such white pigments also generally exhibit a high sedimentation degree and speed.

Suitable white pigments having high refractive index are given by Table 1. The white pigments may be employed singly or in combination. The most preferred white pigment is titanium dioxide.

TABLE 1

| C.I. Number | Chemical name | CAS RN |
| --- | --- | --- |
| Pigment white 1 | Lead hydroxide carbonate | 1319-46-6 |
| Pigment white 3 | Lead sulphate | 7446-14-2 |
| Pigment white 4 | Zinc oxide | 1314-13-2 |
| Pigment white 5 | Lithopone | 1345-05-7 |
| Pigment white 6 | Titanium dioxide | 13463-67-7 |
| Pigment white 7 | Zinc sulphide | 1314-98-3 |
| Pigment white 10 | Barium carbonate | 513-77-9 |
| Pigment white 11 | Antimony trioxide | 1309-64-4 |
| Pigment white 12 | Zirconium oxide | 1314-23-4 |
| Pigment white 14 | Bismuth oxychloride | 7787-59-9 |
| Pigment white 17 | Bismuth subnitrate | 1304-85-4 |
| Pigment white 18 | Calcium carbonate | 471-34-1 |
| Pigment white 19 | Kaolin | 1332-58-7 |
| Pigment white 21 | Barium sulphate | 7727-43-7 |
| Pigment white 24 | Aluminum hydroxide | 21645-51-2 |
| Pigment white 25 | Calcium sulphate | 7778-18-9 |
| Pigment white 27 | Silicon dioxide | 7631-86-9 |
| Pigment white 28 | Calcium metasilicate | 10101-39-0 |
| Pigment white 32 | Zinc phosphate cement | 7779-90-0 |

Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high colouring power can reduce the total amount of titanium oxide, leading to improved storage stability and ejection performance of ink.

For surface treatment of the titanium oxide, an aqueous treatment or a gas phase treatment is applied, and an alumina-silica treating agent is usually employed. Untreated-, alumina treated- or alumina-silica treated-titanium oxide are employable.

Pigment particles in inkjet inks should be sufficiently small to permit free flow of the ink through the inkjet-printing device, especially at the ejecting nozzles. It is also desirable to use small particles to slow down sedimentation.

The numeric average particle diameter of the titanium oxide is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm.

For improving adhesion on specific substrates, the white inkjet ink preferably comprises a polymerizable compound selected from the group consisting of isobornylacrylate, phenoxyethyl acrylate, tetrahydrofurfuryl acrylate, 2-(2-vinyloxyethoxy)ethyl (meth)acrylate and N-vinylcaprolactam.

The white inkjet ink preferably contains the white pigment in an amount of 5 wt % to 40 wt %, more preferably 8 to 30 wt % and most preferably 10 to 25 wt % of white pigment based upon the total weight of the free radical UV curable white inkjet ink.

The viscosity of the white inkjet ink is preferably smaller than 20 mPa·s at 45° C. and at a shear rate of 1,000 s−1, more preferably between 1 and 15 mPa·s at 45° C. and at a shear rate of 1,000 s−1.

The white inkjet ink may further also contain at least one surfactant for obtaining good spreading characteristics on a substrate. The surface tension of the white inkjet ink is preferably in the range of 18 mN/m to 70 mN/m at 25° C., more preferably in the range of 20 mN/m to 40 mN/m at 25° C., and most preferably in the range of 22 mN/m to 30 mN/m at 25° C.

Safeguard Liquids

The safeguard liquid is preferably a substantially colourless liquid, more preferably a colour less liquid. It is preferred not to use any colored components in the safeguard liquid, such as dyes and colour pigments. A very small amount of the latter is sufficient to cause an undesired hue in the printed free radical UV curable white inkjet ink.

In a preferred embodiment, the safeguard liquid consists of monomers, surfactants and optionally surfactants and inhibitors.

In a preferred embodiment, the safeguard liquid is identical to the free radical UV curable white inkjet ink with the exception that it does not contain the white pigment and the dispersant of the free radical UV curable white inkjet. The safeguard liquid may contain a photoinitiator present in the free radical UV curable white inkjet, but preferably it does not contain any photoinitiator present in the free radical UV curable white inkjet. The advantage of having no photoinitator present is that no polymerization can take place due to UV stray light. This has to be weighed against the advantages of having one or more photoinitators present which allows jetting on a substrate instead of spitting the safeguard liquid in a spitting zone.

The safe guard liquid preferably has a surface tension that differs by no more than 2 mN/m from that of the free radical UV curable white inkjet, more preferably the safe guard liquid and the free radical UV curable white inkjet have the same surface tension. This again speeds up the reliable inkjet printing of the third print job.

In a preferred embodiment, the safeguard liquid includes no photoinitiator.

In a preferred embodiment, the one or more monomers present in the safeguard liquid are also present in the free radical UV curable white inkjet ink. Preferably at least two or three monomers are present in the safeguard liquid. This allows for tuning the properties of the safeguard liquid, such as viscosity, surface tension, evaporation rate, and the like.

In a preferred embodiment, the liquid medium of the safeguard liquid consists of monomers and oligomers.

The viscosity of the safeguard liquid is preferably smaller than 20 mPa·s at 45° C. and at a shear rate of 1,000 s−1, more preferably between 1 and 15 mPa·s at 45° C. and at a shear rate of 1,000 s−1.

The safeguard liquid may further also contain at least one surfactant for obtaining good spreading characteristics on a substrate. The surface tension of the safeguard liquid is preferably in the range of 18 mN/m to 70 mN/m at 25° C., more preferably in the range of 20 mN/m to 40 mN/m at 25° C., and most preferably in the range of 22 mN/m to 30 mN/m at 25° C.

Free Radical Polymerizable Monomers

The term free radical polymerizable monomers used here above and below includes not only monomers but also oligomers and pre-polymers.

Any monomer and oligomer capable of free radical polymerization may be used in the free radical UV curable inkjet ink. The monomers and oligomers may have different degrees of polymerizable functionality, and a mixture including combinations of mono-, di-, tri- and higher polymerizable functionality monomers may be used. The viscosity of the UV curable inkjet ink can be adjusted by varying the ratio between the monomers.

The monomers and oligomers used, especially for food packaging applications, are preferably purified compounds having no or almost no impurities, more particularly no toxic or carcinogenic impurities. The impurities are usually derivative compounds obtained during synthesis of the polymerizable compound. Purification methods are well-known to those skilled in the art of manufacturing monomers and oligomers. Sometimes, however, some compounds may be added deliberately to pure polymerizable compounds in harmless amounts, for example, polymerization inhibitors or stabilizers.

Particularly preferred monomers and oligomers are those listed in [0106] to [0115] in EP 1911814 A (AGFA).

Free Radical UV Curable Colour Inkjet Inks

The free radical UV curable colour inkjet inks may include any desired colorant, which can be a dye but is preferably a colour pigment. They may include pigments having a colour selected from the group consisting of black, white, cyan, magenta, yellow, red, orange, violet, blue, green, brown, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Suitable pigments are disclosed in paragraphs [0128] to [0138] of WO 2008/074548 (AGFA GRAPHICS).

The pigments are preferably present in the range of 0.01 to 15%, more preferably in the range of 0.05 to 10% by weight and most preferably in the range of 0.1 to 8% by weight, each based on the total weight of the inkjet ink.

Dispersants

The dispersant is preferably a polymeric dispersant. The dispersant is used to slow down sedimentation of the pigment in a pigmented inkjet ink, such as the free radical UV curable white inkjet ink.

Suitable polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS) incorporated herein as a specific reference.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

- DISPERBYK™ dispersants available from BYK CHEMIE GMBH;
- SOLSPERSE™ dispersants available from NOVEON;
- TEGO™ DISPERS™ dispersants from EVONIK;
- EDAPLAN™ dispersants from MÜNZING CHEMIE;
- ETHACRYL™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Particularly preferred polymeric dispersants include Solsperse™ dispersants from NOVEON, Efka™ dispersants from CIBA SPECIALTY CHEMICALS INC and Disperbyk™ dispersants from BYK CHEMIE GMBH. Particularly preferred dispersants are Solsperse™ 32000, 35000 and 39000 dispersants from NOVEON.

The polymeric dispersant is preferably used in an amount of 2 to 600 wt %, more preferably 5 to 200 wt %, most preferably 50 to 90 wt % based on the weight of the pigment.

Photoinitiators and Co-Initiators

The free radical UV curable white inkjet ink and colour inkjet inks contain a photoinitiator for initiating the polymerization reaction under UV light exposure. The photoinitiator requires less energy to activate than the monomers, oligomers and/or prepolymers to form a polymer.

The photoinitiator is a free radical initiator, more specifically a Norrish type I initiator or a Norrish type II initiator. A free radical photoinitiator is a chemical compound that initiates polymerization of monomers and oligomers when exposed to UV radiation by the formation of a free radical. A Norrish Type I initiator is an initiator which cleaves after excitation, yielding the initiating radical immediately. A Norrish type II-initiator is a photoinitiator which is activated by UV radiation and forms free radicals by hydrogen abstraction from a second compound that becomes the actual initiating free radical. This second compound is called a polymerization synergist or co-initiator. The co-initiator is not a photoinitiator because it is not activated by UV radiation. Both type I and type II photoinitiators can be used in the present invention, alone or in combination.

Suitable photoinitiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photoinitiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4,6trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone.

Suitable commercial photoinitiators include Irgacure™ 184, Irgacure™ 500, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

For a low migration UV curable inkjet ink, the photoinitiator is preferably a so-called diffusion hindered photoinitiator. A diffusion hindered photoinitiator is a photoinitiator which exhibits a much lower mobility in a cured layer of the ink than a monofunctional photoinitiator, such as benzophenone. Several methods can be used to lower the mobility of the photoinitiator. One way is to increase the molecular weight of the photoinitiators so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators.

The diffusion hindered photoinitiator is preferably selected from the group consisting of non-polymeric multifunctional photoinitiators, oligomeric or polymeric photoinitiators and polymerizable photoinitiators. Non-polymeric di- or multifunctional photoinitiators are photoinitiators having two or more photoinitiating moieties and usually have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator or a polymeric photoinitiator.

A preferred diffusion hindered photoinitiator contains one or more photoinitiating functional groups derived from a Norrish type I-photoinitiators elected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

A preferred diffusion hindered photoinitiator contains one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2065362 A (AGFA) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2161264 A (AGFA). A preferred amount of photoinitiator is 0-50 wt %, more preferably 0.1-20 wt %, and most preferably 0.3-15 wt % of the total weight of the curable ink.

In a very preferred embodiment, the UV curable inkjet ink includes a polymerizable or polymeric thioxanthone photoinitiator and an acylphosphine oxide-based polymerization photoinitiator, more preferably a bis(2,4,6-trimethylbenzoyl)-phenylphosphineoxide photoinitiator.

Photoinitiators like bis(2,4,6-trimethylbenzoyl)-phenylphosphineoxide photoinitiator are monofunctional but are allowed by the Swiss ordinance SR 817.023.21 on Objects and Materials due to their very low toxicity level.

In order to increase the photosensitivity further, the UV curable ink may additionally contain co-initiators. Suitable examples of co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; and (3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate). The preferred co-initiators are aminobenzoates.

When one or more co-initiators are included into the UV curable ink, preferably these co-initiators are diffusion hindered for safety reasons.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth)acrylate group, more preferably having at least one acrylate group.

The UV curable inkjet ink preferably includes a polymerizable or polymeric tertiary amine co-initiator.

Preferred diffusion hindered co-initiators are the polymerizable co-initiators disclosed in EP 2053101 A (AGFA) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA).

The UV curable inkjet ink preferably includes the diffusion hindered co-initiator in an amount of 0.1 to 50 wt %, more preferably in an amount of 0.5 to 25 wt %, most preferably in an amount of 1 to 10 wt % of the total weight of the inkjet ink.

Inhibitors

The safeguard liquid and the white inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably less than 2 wt % based on the total weight safeguard liquid or the white inkjet ink.

Surfactants

The safeguard liquid and the white inkjet ink may contain at least one surfactant. The surfactant can be anionic, cationic, non-ionic, or zwitter-ionic and is preferably added in a total quantity less than 3 wt % based on the total weight of the ink and particularly in a total less than 1 wt % based on the total weight of the safeguard liquid or the white inkjet ink.

Preferred surfactants are selected from fluoro surfactants (such as fluorinated hydrocarbons) and silicone surfactants. The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferred commercially available (meth)acrylated silicone surfactants include: Ebecryl™ 350, a silicone diacrylate from Cytec; the polyether modified acrylated polydimethylsiloxane BYK™ UV3500 and BYK™ UV3530, the polyester modified acrylated polydimethylsiloxane BYK™

UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, Tego™ RC711 from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ TM0701T all manufactured by Chisso Corporation; and DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by Gelest, Inc.

In a preferred embodiment, the safeguard liquid includes a surfactant which is also present in the safeguard liquid and the free radical UV curable white inkjet.

In a more preferred embodiment, the one or more surfactants in the safeguard liquid are identical to the one or more surfactants in the free radical UV curable white inkjet.

Solvents

The free radical UV curable white inkjet ink is preferably a non-aqueous ink. The term "non-aqueous" refers to a liquid carrier which should contain no water. However sometimes a small amount, generally less than 5 wt % of water based on the total weight of the ink, can be present. This water was not intentionally added but came into the composition via other components as a contamination, such as for example polar organic solvents. Higher amounts of water than 5 wt % tend to make the non-aqueous liquids and inks instable, preferably the water content is less than 1 wt % based on the total weight of radiation curable composition or ink and most preferably no water at all is present The free radical UV curable white inkjet ink preferably does not contain an evaporable component such as an organic solvent. But sometimes it can be advantageous to incorporate a small amount of an organic solvent to improve adhesion to the surface of a substrate after UV-curing. In this case, the added solvent can be any amount in the range that does not cause problems of solvent resistance and VOC, and preferably 0.1-10.0 wt %, and particularly preferably 0.1-5.0 wt %, each based on the total weight of the curable ink.

The free radical UV curable white inkjet ink most preferably includes no organic solvent or water.

The safeguard liquid preferably includes no organic solvent or water, since during stand still of the continuous ink flow print head of the free radical UV curable white inkjet, solvents in the safeguard liquid may evaporate causing similar as described above for volatile monomer like tetrahydrofurfuryl (meth)acrylate.

One could use high boiling point solvents which are generally used in flushing liquids such as those disclosed by EP 2157163 A (TOYO INK). However, it was found that these glycol ethers and glycol esters having one or more hydrogen atoms in alpha position to the oxygen are very susceptible to auto-oxidation. Peroxides (R—O—O—R) are chemical substances that contain a reactive peroxo unit. Even under normal storage conditions, peroxides can be formed from these glycol ethers and glycol esters and accumulated by the reaction with molecular oxygen through the process called auto-oxidation or peroxidation. This can occur even when containers appear to be tightly closed.

It was surprisingly found that problems of failing nozzles in an inkjet print head after replacing a safeguard liquid containing such glycol ethers and glycol esters by a UV curable white inkjet ink were caused by peroxides present in the recirculation circuit and print head. It is assumed that higher temperatures and frequent recirculation of the safeguard liquid contribute to this auto-oxidation and thus leads to unreliable inkjet printing in an industrial environment.

In a preferred embodiment, the safeguard liquid does not contain any organic solvents selected from the group consisting of glycol ethers and glycol esters. An advantage of using only monomers for the liquid medium of the safeguard liquid is that the safeguard liquid can be used for a prolonged time, especially if no photoinitiators are present, which is very economical situation.

Preparation of Inkjet Inks

The preparation of UV curable inkjet inks is well-known to the skilled person. Preferred methods of preparation are disclosed in paragraphs [0076] to [0085] of WO 2011/069943 (AGFA).

UV Curable Inkjet Printers

The UV curable inkjet printer employed in inkjet printing method according to a preferred embodiment of the present invention includes the free radical UV curable ink set as described above and preferably also contains a continuous ink flow printhead as white ink print head for the free radical UV curable white inkjet ink.

A continuous ink flow printhead is well-known in the art of inkjet printers and also commercially available. For example, EP 2098372 A (AGFA) discloses in FIGS. 1, 3 to 5 recirculation ink supply systems employing a throughflow type print head. In Xaar's TF Technology™, the ink is recirculated past the back of the nozzle during drop ejection. Such technology is disclosed by WO 2007/007074 (XAAR). Suitable commercially available print heads include the Xaar™ 1001 print head, the KM1024 I series print heads from Konica Minolta, and the CF1 printhead from Toshiba Tec Corporation.

The preferred type print head for the free radical UV curable white inkjet ink, and the one or more free radical UV curable colour inkjet inks is a piezoelectric print head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

FIG. 1 and FIG. 2 are simplified schematic representations of an implementation of the continuous ink flow print head and the connected recirculation circuit for safeguard liquid and free radical UV curable white inkjet ink. The skilled person in designing and implementing UV curable inkjet printer is fully capable of including further valves, vacuum pumps, circulation pumps, air-buffers, filters, and the like in order to have a reliable operational UV curable inkjet printer. For example, the free radical UV curable white inkjet ink supply tank may contain an agitator for the white inkjet ink to prevent sedimentation exemplified by a stirring device 5 in FIG. 1 and FIG. 2.

The UV curable inkjet printer preferably includes at least a recirculation circuit 11 for the safeguard liquid which is connected to the continuous ink flow print head as shown in FIG. 1. More preferably, the UV curable inkjet printer includes also includes also a recirculation circuit 11 connected to the continuous ink flow print head for the free radical UV curable white inkjet ink connected to the continuous ink flow print head.

In a preferred embodiment, at least part of the recirculation circuit 11 is used by both the safeguard liquid and the free radical UV curable white inkjet ink as shown in FIG. 2. The advantage is that sedimentation and clogging in the recirculation circuit can then be effectively avoided.

Steps b and d of the inkjet printing method can be accomplished manually, however for reasons of productivity these steps are preferably automated using e.g. a computer connected or integrated with a display in the UV curable inkjet printer.

For removing white ink or safeguard liquid in the area between the nozzle plate 13 and the filter 15 of the continuous ink flow print head 1 shown in FIG. 3 during step b respectively step d, the UV curable inkjet printer preferably includes a spitting zone equipped e.g. with a spitting tray. In a multipass inkjet printer, the spitting can be executed during a maintenance period. However for enhancing productivity, the spitting is preferably executed during the second print job of the inkjet printing method according to a preferred embodiment of the invention. In a single pass inkjet printing method, a spitting tray is preferably inserted underneath the page wide inkjet print heads or multiple staggered inkjet print heads.

Curing Devices

The UV curable white inkjet ink is cured by exposure to ultraviolet radiation. The curing device may be arranged in combination with the white ink print head of the UV curable inkjet printer, travelling therewith so that the curing radiation is applied very shortly after jetting. Such rapid curing is sometimes referred to as "pin curing" and used for enhancing image quality by controlling the dot size. Preferably such curing device consists of one or more UV LEDs. In such an arrangement, it can be difficult to provide other types of curing devices that are small enough to be connected to and travelling with the print head. Therefore, a static fixed radiation source may be employed, e.g. a source of curing UV-light, connected to the radiation source by a flexible radiation conductor such as a fiber optic bundle or an internally reflective flexible tube. Alternatively, the actinic radiation may be supplied from a fixed source to the radiation head by an arrangement of mirrors including a mirror upon the print head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the inkjet printer contains one or more UV LEDs with a wavelength larger than 360 nm, preferably one or more UV LEDs with a wavelength larger than 380 nm, and most preferably UV LEDs with a wavelength of about 395 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 100 ppm, but are generally in the range of 200 ppm to 1200 ppm ultraviolet radiation.

EXAMPLES

Materials

All materials used in the examples were readily available from standard sources such as Sigma-Aldrich (Belgium) and Acros (Belgium) unless otherwise specified.

TR52 is TIOXIDE TR 52™, a surface modified titanium dioxide from HUNTSMAN CHEMICAL GROUP.

DB162 is an abbreviation used for the polymeric dispersant Disperbyk™ 162 available from BYK CHEMIE GMBH whereof the solvent mixture of 2-methoxy-1-methylethylacetate, xylene and n-butylacetate was removed.

INHIB is a mixture forming a polymerization inhibitor having a composition according to Table 2.

TABLE 2

| Component | wt % |
| --- | --- |
| DPGDA | 82.4 |
| p-methoxyphenol | 4.0 |
| 2,6-di-tert-butyl-4-methylphenol | 10.0 |
| Cupferron ™ AL | 3.6 |

Cupferron™ AL is aluminum N-nitrosophenylhydroxylamine from WAKO CHEMICALS LTD.

DPGDA is dipropyleneglycoldiacrylate from SARTOMER. PEA is 2-phenoxyethyl acrylate available as Sartomer™ SR339C from SARTOMER.

VEEA is 2-(vinylethoxy)ethyl acrylate, a difunctional monomer available from NIPPON SHOKUBAI, Japan.

VCL is N-vinyl caprolactam available from BASF BELGIUM, NV.

TBCH is 4-tert.butylcyclohexylacrylate available under the trade name of Laromer™ TBCH from BASF.

15EO-TMPTA is an ethoxylated trimethylolpropane triacrylate containing fifteen ethoxy units having a molecular weight of 956 and available as Sartomer™ SR9035 from SARTOMER. G1122 is a monofunctional urethane acrylate having a Tg of −3° C. and available as Genomer™ 1122 from RAHN having the Formula:

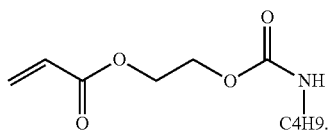

KT046 is Esacure™ KT046 is a mixture of trimethylbenzoyldiphenylphosphine oxide, alfa-hydroxyketone en benzophenone derivatives available from FRATELLI LAMBERTI SPA.

TPO is an abbreviation used for 2,4,6-trimethylbenzoyl-diphenyl-phosphineoxide available under the trade name Darocur™ TPO from CIBA SPECIALTY CHEMICALS.

Tego™ Rad 2200 N is a crosslinkable silicone polyether acrylate from EVONIK.

Tego™ Glide 410 is a polysiloxan polyether copolymer from EVONIK.

AMG2 is: Anapurna™ M G2 Yellow ink, a UV curable yellow acrylate based inkjet ink available from Agfa Graphics NV.

DPNB is Dowanol™ DPnB, a dipropylene glycol n-butyl ether available from Dow Chemical Company having a boiling point at 760 mm Hg of 230° C., a viscosity at 25° C. of 4.9 mPa·s and a surface tension of 28.4 mN/m at 25° C.

TPM is Dowanol™ TPM, a tripropylene glycol methyl ether available from Dow Chemical Company having a boiling point at 760 mm Hg of 243° C., a viscosity at 25° C. of 5.5 mPa·s and a surface tension of 30.0 mN/m at 25° C.

DMM is Proglyde™ DMM, a dipropylene glycol dimethyl ether having a boiling point at 760 mm Hg of 175° C., a viscosity at 25° C. of 1.0 mPa·s and a surface tension of 26.3 mN/m at 25° C.

Merckoquant™ test strips are available from MERCK.

Measurement Methods

1. Surface Tension

The static surface tension was measured with a KRÜSS tensiometer K9 from KRÜSS GmbH, Germany at 25° C. after 60 seconds.

2. Viscosity

The viscosity of the primer was measured using a Brookfield DV-II+ viscometer at 45° C. at 12 rotations per minute (RPM) using a CPE 40 spindle. This corresponds to a shear rate of 1,000 s−1.

3. Average Particle Size of Inkjet Ink

The average particle size of pigment particles in a non-aqueous inkjet ink was determined with a Brookhaven Instruments Particle Sizer BI90plus based upon the principle of dynamic light scattering. The ink or dispersion was diluted with ethyl acetate to a pigment concentration of 0.002 wt %. The measurement settings of the BI90plus were: 5 runs at 23° C., angle of 90°, wavelength of 635 nm and graphics=correction function.

4. Peroxide Test

The peroxide concentration was measured semi-quantitatively by visual comparison of the reaction zone of a Merckoquant™ test strip with the fields of a calibrated colour scale. Peroxidase transfers peroxide oxygen to an organic redox indicator. This produces a blue oxidation product. The Merckoquant™ test strips have a colour scale including colour fields for a peroxide content as shown by Table 3.

TABLE 3

| Merckoquant™ test strip | Colour scale includes colour fields for |
|---|---|
| Cat. No. 1.10011.0001 | 0.5-2-5-10-25 ppm |
| Cat. No. 1.10081.0001 | 1-3-10-30-100 ppm |
| Cat. No. 1.10337.0001 | 100-200-400-600-800-1000 ppm |

The reaction zone of the test strip was immersed in the sample at a temperature of 25° C. for 1 second. Excess liquid was allowed to run off via the long edge of the strip onto an absorbent paper towel. After 15 seconds the reaction zone was compared with the best corresponding colour field on the colour scale in order to determine the peroxide content in mg/L $H_2O_2$.

Example 1

This example illustrates the use of a safeguard liquid for a white inkjet printing method.

Preparation White Inkjet Ink

A concentrated white pigment dispersion W1 was prepared having a composition according to Table 4.

TABLE 4

| wt % of: | W1 |
|---|---|
| TR52 | 30.0 |
| DB162 | 10.0 |
| INHIB | 2.0 |
| PEA | 58.0 |

The concentrated white pigment dispersion W1 was made by mixing 15.6 kg of PEA, 13.5 kg of the white pigment TR52, 0.9 kg of the inhibitor INHIB and 15.0 kg of a 30% solution of the polymeric dispersant DB162 in VEEA for 30 minutes in a 60 L vessel equipped with a DISPERLUX™ disperser (from DISPERLUX S.A.R.L., Luxembourg). This mixture was subsequently milled in a DYNO™-MILL KD 6 from the company WAB Willy A. Bachofen (Switzerland) using 0.40 mm yttrium-stabilized zirconium oxide-beads. The bead mill was filled for 52% with the grinding beads and operated in recirculation mode for 1 hour by using a tip speed of 12 m/s. The milling chamber is water-cooled during the operation.

The concentrated white pigment dispersion W1 was then mixed with the components according to Table 5 to produce a free radical UV curable white inkjet ink Ink-W. The viscosity, surface tension and the average particle size of the white inkjet were determined.

TABLE 5

| in wt % of ink | Ink-W |
|---|---|
| TR52 | 13.00 |
| DB162 | 4.33 |
| PEA | 38.42 |
| TBCH | 10.00 |
| G1122 | 6.00 |
| VCL | 20.00 |
| KT046 | 4.00 |
| TPO | 2.95 |
| INHIB | 1.00 |
| Tego™ Glide 410 | 0.30 |
| Physical properties | |
| Viscosity at 45° C. | 11.5 mPa·s |
| Surface tension 25° C. | 22.0 mN/m |
| Average particle size | 255 nm |

Preparation Safeguard Liquid

The safeguard liquid SL-1 was prepared by mixing the components according to Table 6. The viscosity and the surface tension of the safeguard liquid SL-1 was determined.

TABLE 6

| in wt % of SL-1 | SL-1 |
|---|---|
| DPGDA | 45.10 |
| 15EO-TMPTA | 22.27 |
| PEA | 30.63 |
| Tego ™ Rad 2200 N | 1.00 |
| INHIB | 1.00 |
| Physical properties | |
| Viscosity at 45° C. | 9.4 mPa · s |
| Surface tension at 25° C. | 22.0 mN/m |

Evaluation and Results

A white inkjet ink printhead of an Anapurna™ Mw UV curable inkjet printer from Agfa Graphics was filled with the free radical UV curable white inkjet ink Ink-W of Table 5. A white image was printed on a PET substrate and cured. All nozzles appeared to be operational. Then printing was stopped and the white ink INK-W was replaced within 15 minutes by the safeguard liquid SL-1, including purging of the nozzles with the safeguard liquid SL-1. After 2 days of not printing with white inkjet printhead, the safeguard liquid SL-1 was replaced by the white ink INK-W and printing was restarted. The same white image was again printed on a PET substrate and cured. All nozzles appeared to be operational, since no line defects could be observed.

Then printing was stopped for a specific time named the "print interruption time". After this interruption time, the same white image was printed again and the number of failing nozzles was estimated from the line defects (missing white ink) in the image. The results are shown in Table 7.

TABLE 7

| Print interruption time | Failing nozzles |
|---|---|
| 5 minutes | none |
| 10 minutes | none |
| 20 minutes | none |
| 60 minutes | about 50% of nozzles missing |
| 5x purge and wipe | about 20% of nozzles missing |
| 10x purge and wipe | about 10% of nozzles missing |
| 2 days | about 90% of nozzles missing |

Table 7 shows that after a print interruption time of 20 minutes that all nozzles remained operational. After 60 minutes of non-printing, about half of the nozzles were incapable of jetting white ink. A cleaning operation of ten times purging and wiping the nozzle plate of the printhead could restore only about 90% of the nozzles. After this purging and wiping the printhead was left to stand for another 2 days. On restarting the printing of the white image it was observed that only about 10% of the nozzles were working.

From the above results, it should be clear that temporary replacement of the white inkjet ink by a safeguard liquid enhances the reliability of the inkjet printing, allowing to switch between print jobs which do require or do not require white inkjet printing.

Example 2

This example illustrates the advantages of using only monomers in the safeguard liquid and no glycol ethers or glycol esters. The example is performed with a pigmented free radical UV curable yellow inkjet ink which is less critical for sedimentation than a free radical UV curable white inkjet ink.

Evaluation and Results

Two maintenance liquids DPNB-1 and DPNB-2 both consisting of DPNB but having a different peroxide content were selected as shown by Table 8.

TABLE 8

| Maintenance Liquid | Peroxide Test |
|---|---|
| DPNB-1 | 2 ppm |
| DPNB-2 | 50 ppm |

The print heads of an: Anapurna™ My inkjet printer from Agfa Graphics which was printing the yellow UV curable inkjet ink AMG2 was filled using the maintenance liquid DPNB-1. After one week, the safeguard liquid DPNB-1 was discharged from the inkjet printer via the print heads operating at 45° C. and the inkjet printer was again loaded with UV curable inkjet ink AMG2. On printing test images no 'failing nozzles' were observed in the test images. Failing nozzles occur when small gel-like matter clog a nozzle. When a nozzle of an inkjet print head is clogged, this results in a interruption of the image due to the lack of deposited ink.

The print head of the same: Anapurna™ My inkjet printer were then filled using the maintenance liquid DPNB-2. After one week, the maintenance liquid DPNB-2 was discharged from via the print heads operating at 45° C. and the inkjet printer was again loaded with UV curable inkjet ink AMG2. On printing test images several 'failing nozzles' were observed in the test images.

Both maintenance liquids DPNB-1 and DPNB-2 were also mixed in a ratio of maintenance liquid to AMG2 ink of 90 to 10, together with some other maintenance liquids listed in Table 9. The viscosity was measured after preparation and again after a heat treatment of 1 week at 80° C. A clear viscosity increase was only observed for the maintenance liquids DPNB-2 and TPM.

TABLE 9

| Maintenance Liquid | Peroxide Test | 90:10 mixture with AMG2 Viscosity after 1 week at 80° C. |
|---|---|---|
| DPNB-1 | 2 ppm | OK |
| DPNB-2 | 50 ppm | Not OK |
| DMM | 0.5 ppm | OK |
| TPM | 50 ppm | Not OK |

REFERENCE SIGNS LIST 1 continuous ink flow print head
2 white ink droplets
3 white ink supply tank
4 safeguard liquid supply tank
5 stirring device
6 valve
7 valve
8 print head inlet
9 print head outlet
10 valve
11 recirculation circuit
12 valve
13 nozzle plate

What is claimed is:

1. A free radical UV curable inkjet ink set comprising:
a free radical UV curable white inkjet ink;
one or more free radical UV curable color inkjet inks; and
a single safeguard liquid; wherein
the safeguard liquid is a substantially colorless liquid including one or more free radical polymerizable monomers that are also included in the free radical UV curable white inkjet ink; and
the safe guard liquid has a surface tension at 25° C. that differs by no more than 2 mN/m from a surface tension of the free radical UV curable white inkjet ink.

2. The free radical UV curable inkjet ink set according to claim 1, wherein at least two or three of the free radical polymerizable monomers are included in the safeguard liquid.

3. The free radical UV curable inkjet ink set according to claim 1, wherein the free radical polymerizable monomers of the safeguard liquid are included in a same ratio as in the free radical UV curable white inkjet ink.

4. The free radical UV curable inkjet ink set according to claim 1, wherein the safeguard liquid contains no photoinitiator.

5. The free radical UV curable inkjet ink set according to claim 1, wherein the safeguard liquid includes the free radical polymerizable monomers, free radical polymerizable oligomers, and one or more surfactants and inhibitors.

6. A UV curable inkjet printer comprising:
a free radical UV curable ink set including a free radical UV curable white inkjet ink, one or more free radical UV curable color inkjet inks, and a safeguard liquid; and
a white ink printhead that prints the free radical UV curable white inkjet ink; wherein
the safeguard liquid is a substantially colorless liquid including one or more free radical polymerizable monomers that are also included in the free radical UV curable white inkjet ink;
the safe guard liquid has a surface tension at 25° C. that differs by no more than 2 mN/m from a surface tension of the free radical UV curable white inkjet ink;
the white ink printhead is a continuous ink flow printhead; and
the UV curable inkjet printer further includes a recirculation circuit for the safeguard liquid connected to the continuous ink flow printhead for the free radical UV curable white inkjet ink.

\* \* \* \* \*